Feb. 2, 1960 R. C. HOFFMAN 2,923,173
TRANSMISSION AND FINAL DRIVE ASSEMBLY
Filed March 8, 1957 5 Sheets-Sheet 1
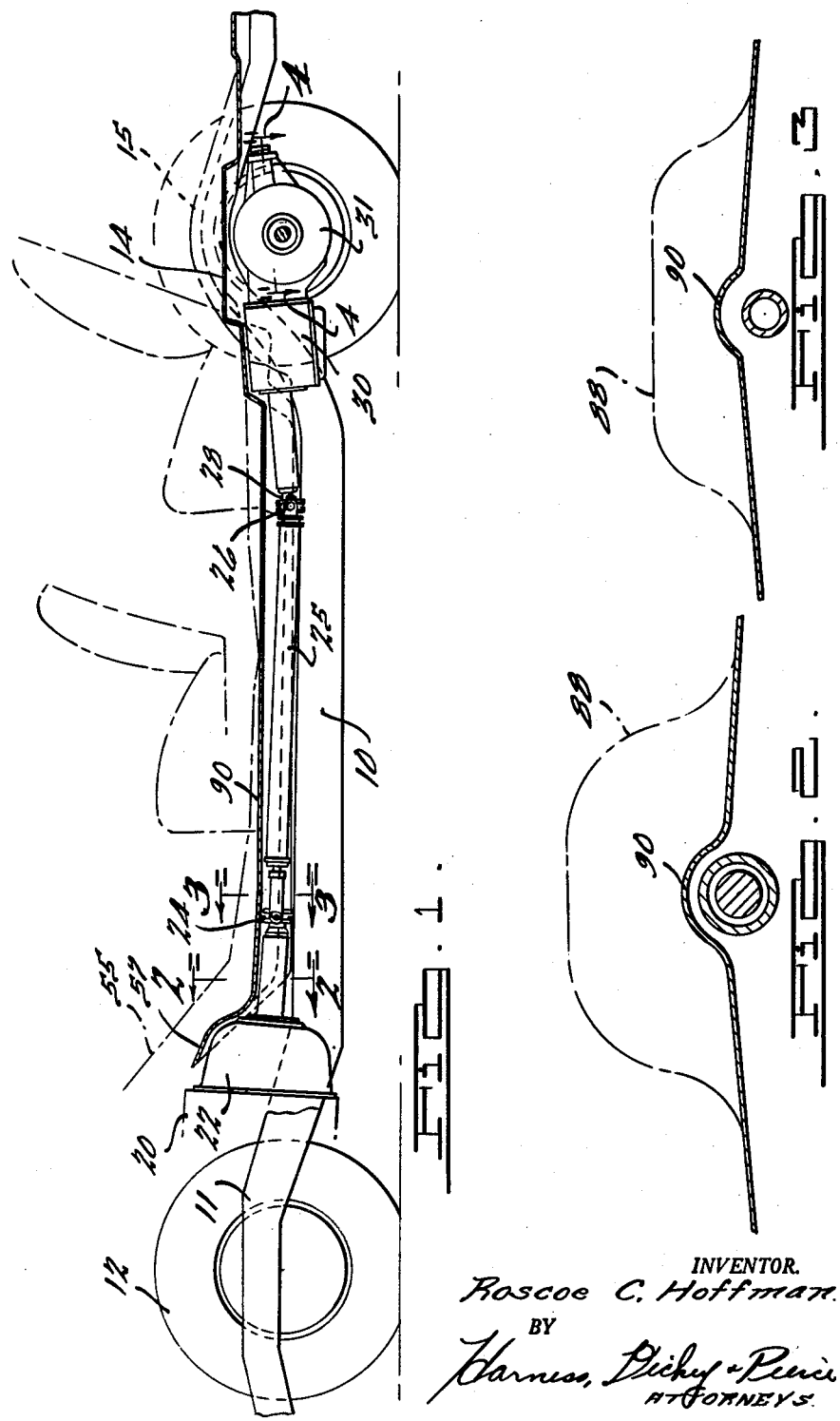
INVENTOR.
Roscoe C. Hoffman
BY
Harness, Dickey & Pierce
ATTORNEYS

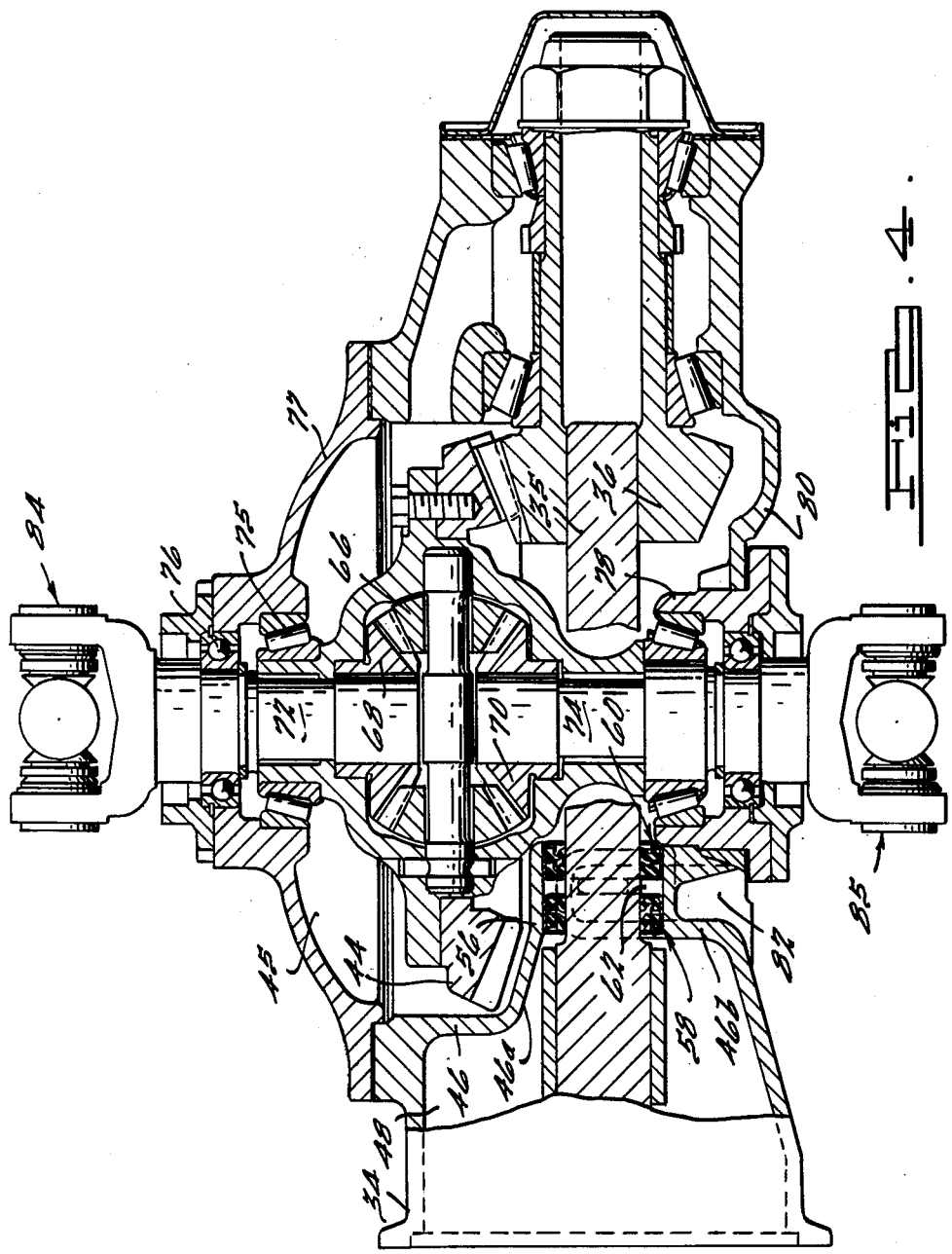

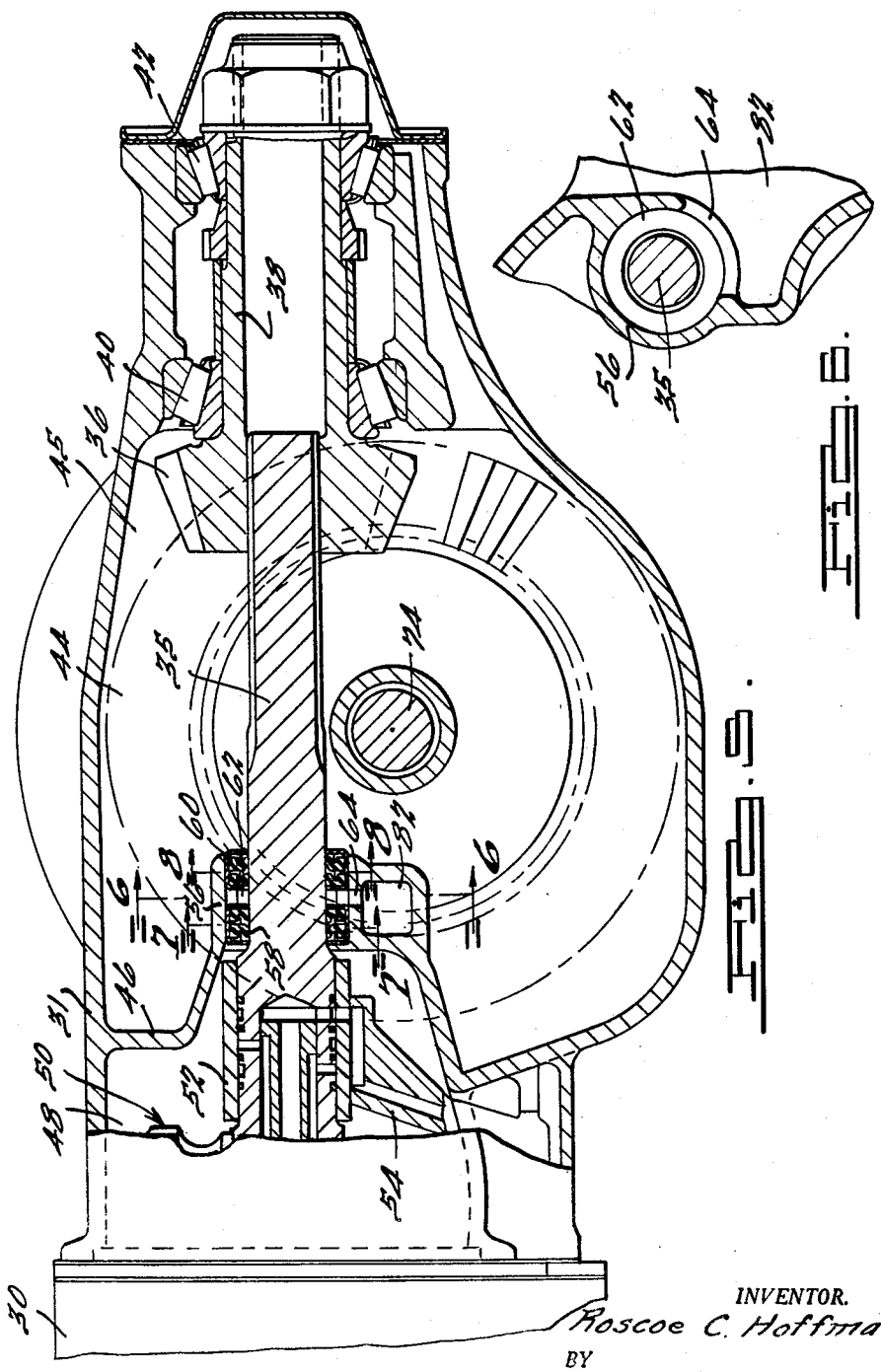

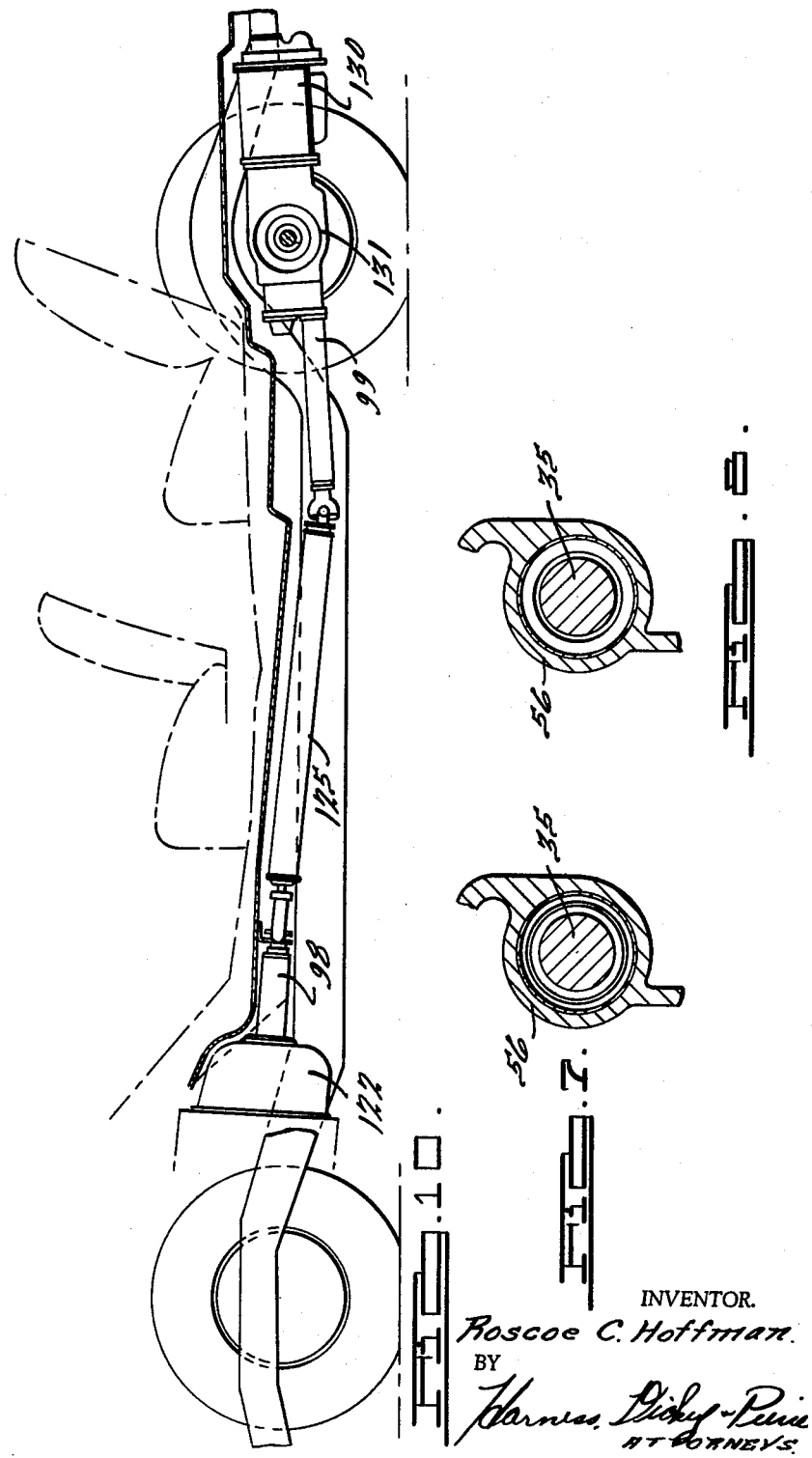

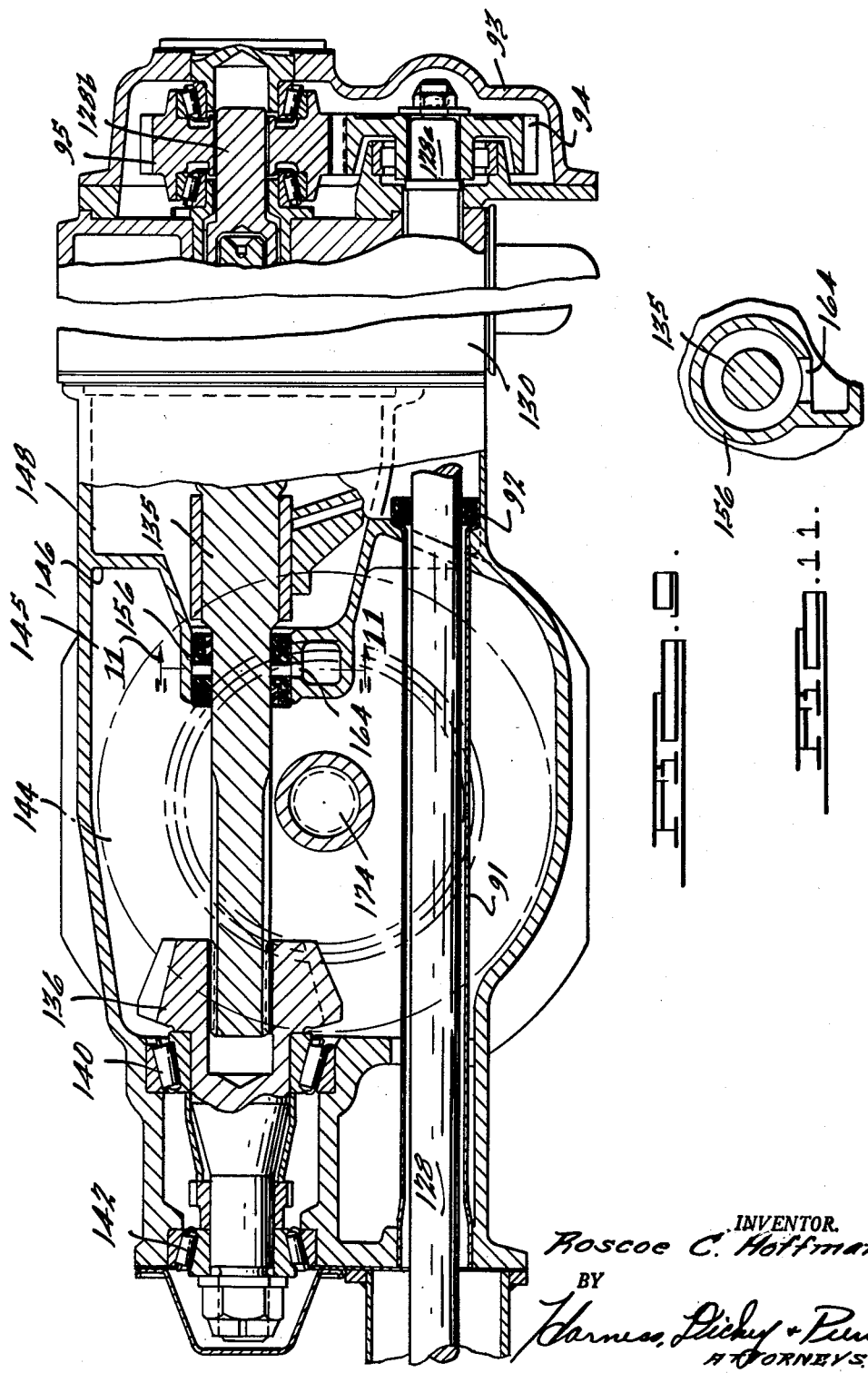

United States Patent Office 2,923,173
Patented Feb. 2, 1960

2,923,173

TRANSMISSION AND FINAL DRIVE ASSEMBLY

Roscoe C. Hoffman, Detroit, Mich.

Application March 8, 1957, Serial No. 644,796

4 Claims. (Cl. 74—700)

The present invention relates to the construction of motor vehicles, and particularly to improvements in the construction of certain of the driving components, and to the arrangement of such driving components with relation to each other and with relation to parts of the body structure.

An important object of the invention is to provide an improved motor vehicle construction of the type having a sprung differential and wherein the differential and at least a portion of the transmission are arranged at the rear of the vehicle.

Another object is to provide a vehicle of the indicated character wherein the transmission and differential components which are located at the rear of the vehicle are assembled into a rigid unit, the arrangement being such that although the rear axle or driving axle components and a portion of transmission mechanism are rigidly secured to one another and effectively integrated, they are nevertheless completely isolated from one another in so far as the working components are concerned, may be manufactured separately, and may be removed and serviced individually.

An object related to that last stated is to provide such a rigidly interconnected driving axle and transmission mechanism assembly which is of minimum size and minimum vertical height, affording maximum road clearance, yet all of the parts of which are of large size, rugged construction, easily accessible for servicing, and so isolated that different types of lubricants can be used in the transmission mechanism and the driving axle mechanism without danger of leakage of either lubricant from one portion into the other.

A related object is to provide such an improved motor vehicle wherein the drive shaft tunnel which is customarily required to provide clearance for the propeller shaft may be eliminated or greatly reduced, as the designer may prefer.

Still another object is to provide such an improved motor vehicle construction wherein the engine and associated front transmission components may be arranged at the same angle with respect to the propeller shaft as is the input shaft to the rear transmission components, so that two conventional universal joints may be employed, one at each end of the propeller shaft, the arrangement being such that any non-uniform velocity effects of the two joints cancel each other and uniform output velocity ratio with respect to the engine may be maintained without the necessity of using joints of the constant velocity type.

Still another object is to provide an improved assembly consisting of final drive and transmission components wherein the mechanical parts of these two components are effectively isolated from one another, as previously mentioned, a unique venting arrangement being provided whereby if, due to expansion, wear, temperature changes or any other cause, lubricant is forced from either of these isolated sections, it is effectively vented to the atmosphere and cannot enter the other section. Contamination of the lubricant of either section, by the lubricant employed in the other, which must possess different characteristics, is thus rendered impossible.

Other objects and advantages will become apparent upon consideration of the present disclosure in its entirety.

In the drawings:

Figure 1 is a diagrammatic side elevational view, partly in longitudinal section, showing the principal components of the structure of a motor vehicle incorporating my present invention;

Figs. 2 and 3 are sectional details taken substantially on the lines 2—2 and 3—3 respectively of Fig. 1, and looking in the direction of the arrows;

Fig. 4 is a horizontal sectional plan view taken substantially on the line 4—4 of Fig. 1, and looking in the direction of the arrows;

Fig. 5 is a sectional view taken substantially on the line 5—5 of Fig. 4, and looking in the direction of the arrows;

Figs. 6, 7 and 8 are sectional details taken substantially on the lines 6—6, 7—7 and 8—8 respectively of Fig. 5, and looking in the direction of the arrows;

Fig. 9 is a view similar to Fig. 1 showing a modification;

Fig. 10 is a view similar to Fig. 5, but partly broken away, of the corresponding parts of the modification of Fig. 9; and Fig. 11 is a sectional detail taken substantially on the line 11—11 of Fig. 10, and looking in the direction of the arrows.

Referring now to the drawings, reference character 10 designates generally the chassis frame of a passenger automobile of the sedan type. The frame may, as shown, be substantially conventional in its shape and arrangement, the forward and rear portions of the frame being kicked up, as indicated at 11 and 14. The final drive assembly and related components are mounted at the rear beneath the floor pan and are sprung. The floor pan, with my development, may be constructed and positioned as shown at 14.

An engine is diagrammatically indicated at 20. Although the details of the engine form no part of my invention and are not illustrated, it will be noted that the engine is shown as, and may conveniently be, mounted in a conventional position at the front end of the car. The engine may drive the propeller shaft 25 through a hydraulic torque conveying device 22 which may be a torque converter and which is directly secured with respect to the rear end of the engine, and only the exterior of which is illustrated, since its details do not form a part of the present invention. The engine and torque converter incline downwardly toward the rear and are connected to the propeller shaft 25 through a universal joint 24. Propeller shaft 25 is in turn connected through a universal joint 26 with the input shaft 28 of a gear transmission assembly 30. The transmission input shaft 28 may be inclined upwardly toward the rear and at the same angle with respect to the propeller shaft 25 as is the output shaft of the torque converter 22. Thus any difference in angular velocity created by the universal joint 24 is offset by the universal joint 26. In the preferred arrangement illustrated, the torque converting means is divided into two portions, the hydraulic converter portion 22 being at the front and secured to the engine, and the gear-type converter portion 30 being at the rear and secured to the differential case 31. The portions 22 and 30 may correspond to the equivalent portions of an automatic transmission of a known type wherein the corresponding portions are housed in a rigidly integrated housing assembly. The construction thereof may be in conformity with any of several well known types. If a part of the transmission control system responsive to torque-speed factors to determine changes of transmission ratio includes a member, such as a front pump, responsive to engine speed, and/or a member responsive to torque demand as indicated by the extent of accelerator pedal position, for example, it will be appreciated that the means responsive to such controlling influences may either by hydraulic or electrical, but in either event can conveniently be conducted to the automatic gear transmission assembly 30 so that the mounting of the latter at the rear of the vehicle interposes no obstacle and its operation may be essentially conventional.

Such controlling systems and transmission constructions are now well understood in the art and need not be considered in detail herein, although it might be stated that typically the transmission construction might be of the type illustrated and described in the publication SAE Journal, issue of February 1956, commencing at page 60. In the transmission construction therein illustrated and described, the torque converter assembly, corresponding to the assembly 22 shown in Fig. 1 herein, is directly bolted to a gear transmission assembly corresponding to the gear transmission assembly 30 illustrated in Fig. 1 hereof, a short internal shaft being utilized to connect these parts, rather than the relatively long propeller shaft and universal joint portions 25, 24, 26 hereinabove described. In the present construction, although these parts 22, 30 have been physically segregated, their internal construction and operation have not been changed.

As best shown in Fig. 5, the rear wall of the case of the gear transmission assembly portion 30 is substantially flat and is directly secured as by screws 32 to the differential case 31. Such rigidly assembled case portions 30—31 are attached to the frame 10 by suitable mechanical supporting means (not shown), as for example, by bolting the same to appropriately positioned frame cross members. The transmission output shaft 35 extends into the differential case 31 and substantially through and to the rear end of the latter, where it is splined to a differential drive pinion 36 integral with a quill portion 38 journaled in the case, as in tapered roller bearings 40, 42.

The differential pinion 36 meshes with a differential ring gear 44, and these and the other components of the differential may be essentially conventional. As shown these gears are of the hypoid type, and the pinion 36 is located at the rear of the ring gear, the pinion drive shaft 35 extending above the axis of the ring gear and to the rear thereof as shown. The differential compartment 45 in the case 34 is isolated at the front from the transmission by a partitioning wall 46. Forward of the wall 46 is a compartment 48 which, although formed in the case 34, houses certain of the transmission components, including the speed responsive governor assembly 50, the fluid distributor sleeve 52 and fluid manifolding portion 54.

In presently used conventionally arranged motor car constructions employing transmission mechanisms mounted entirely at the front of the car and corresponding to the arrangement illustrated in the February 1956 SAE Journal, referred to above, a compartment corresponding to the compartment 48 is formed as a part of the transmission case. As shown in Fig. 4, the partition 46, on its side closest to the ring gear 44 extends closely beside the distributor sleeve 52 and is shaped, as shown at 46a, to provide clearance for the ring gear. The partition 46 completely isolates the transmission compartment portion 48 from the differential compartment portion 45 and is provided at its rear extremity with a generally cylindrical spigot portion 56 substantially encircling the shaft 35. Two axially spaced lubricant seal assemblies 58, 60, are fitted within portion 56. The space between the seal assemblies 58, 60 is designated 62 and is thus isolated from both enclosures. The space 62 is connuected to atmosphere through a large slotlike opening 64 providing direct communication between the space 62 and the air outside the structure so that any lubricant which escapes past either of the seal assemblies 58, 60 is discharged to the exterior, and no pressure can develop in the area 62 between the two seal assemblies which might tend to force into either section lubricant discharged from the other. Inasmuch as the type of lubricant required in the final drive assembly is entirely different from and would not be suitable for use in the transmission, and would in fact be harmful if allowed to find its way into the transmission, and vice versa, this provision of means for separately sealing the two compartments, by means of two spaced sealing means, while venting the space between the sealing means in such manner as to prevent any possibility of the development of pressure in the area between them, is of great importance.

As shown in Fig. 4 the differential mechanism per se may also be substantially conventional. The hypoid drive pinion 36 meshes with a hypoid ring gear 44 which supports planetary differential drive pinions as 66 meshing with side gears 68, 70, one such side gear being fast upon and serving to drive each of the differential output shafts as 72, 74 respectively. Output shaft 72 projects outwardly through suitable bearing and sealing means, generally designated 75, 76 carried by a removable cover 77, while the output shaft 74 is similarly supported and journaled in a bearing supporting sleeve member 78 secured in the opposite side wall 80 of the case. It will be seen that the side wall 80 is relatively close to the shaft 35, as the only elements required to be accommodated on this side of the shaft comprise the bearing means for the shaft 74, and the corresponding side of the drive pinion 36. In lateral alignment with the vent opening 64 the side wall 80 is formed or indented laterally inwardly to provide a pocket 82 into which the opening 84 discharges. The front wall of the pocket may actually be formed by a portion of or extension of the partitioning wall 46, such portion being designated 46b in Fig. 4.

Inasmuch as the complete integrated transmission and differential assembly is adapted to be rigidly secured to a sprung portion of the vehicle, the drive to the wheels may be effected through universal joints, indicated at 84, 85.

The manner in which the combined transmission and differential assembly is accommodated in the space beneath and to the rear of the rear seat of a motor vehicle of a conventional two-seated variety having the engine in front is clearly brought out in Fig. 1. As shown in Figs. 2 and 3 the large clearance tunnel which is customarily required in order to accommodate the propeller shaft and still allow the use of a low roof and low seating position may be substantially eliminated, with my invention. In Figs. 2 and 3 a conventional tunnel is indicated in broken lines at 88, while as shown in full lines, the tunnel when the present invention is employed, may be reduced to very small proportions or substantially eliminated, depending upon the desired floor height. In the design shown, a small tunnel 90 is retained, and a slight pitch is given to the floor which augments the tunneling effect, although both factors are so minor that the feeling to the passengers is substantially that of a flat floor.

The entire integrated transmission assembly in such present conventional motor car constructions is so bulky that it is necessary to provide in the front floor boards or floor pan structure of the motor car a large protruding embossment or enclosure which projects into the passenger compartment and which for obvious reasons is commonly referred to as a "doghouse." Its projection into the mid portion of the front passenger compartment of conventional motor vehicles has long been a source of inconvenience.

With the utilization of the present invention the conventional doghouse, which might have a contour such as indicated at 55 in broken lines in Fig. 1, is substantially eliminated, so that the mid portion of the floor in the front passenger compartment is essentially flat, as are the inclined toe boards. This allows a passenger sitting in the center of the front seat the same comfortable seating and the same comfortable foot room as passengers sitting in the left-hand and right-hand portions of the front seat. The position to which this portion of the floor can be moved in a preferred illustrative design is indicated at 57 in Fig. 1.

In the modified embodiment shown in Figs. 9–11, wherein components corresponding to those previously described are designated by like reference characters one hundred integers higher, an integrated transmission and final drive assembly is provided which is also adapted for installations at the rear, as indicated in Fig. 10. In this second embodiment the transmission input shaft 135 projects into the differential housing portion 131 from the front and extends entirely therethrough from front to back beneath the axis of the axle shafts. In this embodiment the gear transmission assembly, generally designated 130, is at the rear, the mechanism being similar but inverted and turned end-for-end with respect to the gear transmission mechanism employed with the parts arranged as shown in the first embodiment. The partitioning wall which separates the differential compartment 145 from the gear transmission compartment 148, and which corresponds generally to the partition designated 46 in the first embodiment is designated 146. The transmission input shaft 128 is isolated from the differential compartment 145 by a tube 91 sealed at its forward end in the front wall and at its rear end sealed in the partitioning wall 146. Lubricant retaining means 92 may be provided to prevent the escape of lubricant from the transmission compartment through the space between the shaft 128 and the tube 91. It will be seen that if any lubricant should pass the sealing means 92, it could only escape forwardly outside the differential compartment. A continuation 128a of the input shaft 128 extends through the transmission case from front to rear below the operative components thereof, and at its rear end beneath the rear cover plate 93 carries a spur gear 94 meshing with a spur gear 95 which drives the transmission input shaft 128b. The transmission output shaft 135, which corresponds to the shaft 35 of the first embodiment, extends forwardly through the partion 146 and through the differential compartment from rear to front, above the axis of the ring gear and output shafts, and at its forward end is keyed to a driving pinion 136 meshing with the differential ring gear 144. The pinion 136 is supported similarly to the pinion 36 of the first embodiment in bearings 140, 142.

A partly cylindrical supporting portion 156 corresponding to the portion 56 of the first embodiment is carried by the partitioning wall 146 and projects forwardly into the differential compartment and beside the ring gear 144, the side of such portion 156 opposite to the ring gear communicating with the atmosphere through an opening 164 as brought out in Fig. 11. It will be seen, that, as in the first embodiment, this arrangement provides complete protection against the possibility of contamination of the lubricant employed in either section by the lubrication contained in the other.

It will also be appreciated that in this embodiment the mechanical components employed may be largely identical with those employed in the first embodiment, so that both types may be conveniently manufactured without substantial duplication of tooling costs.

I preferably utilize at the front end, projecting rearwardly from the torque converter assembly 122, a spigot 98 which is as long as practicable and which is of course equipped with a bearing (not shown) at its rear extremity. The rear assembly is also preferably provided with a spigot as 99, similarly provided at its forward end with an unillustrated bearing assembly and which is as long as practicable, so that the propeller shaft 125 is as short as practicable. The spigots may of course be given additional support by appropriate attachment to the frame structure. While the propeller shaft, in my invention, turns at a speed approximating that of the engine under most driving conditions it is never required to turn at a speed higher than engine speed, as is the case where an overdrive gear is incorporated in a front-located transmission, and if the highest speed ratio drive in the transmission incorporated in my improved arrangement is an overdrive, it will be appreciated that an advantage is secured by reason of the lower relative speed of rotation of the propeller shaft when the overdrive is operating.

As particularly brought out in Fig. 10, the arrangement of the second embodiment allows the gear transmission section 130 to be positioned completely behind the rear seat, and the designer is thus given the opportunity to lower the seating and the floor in the rear portion of the passenger compartment still further.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. A combined transmission and final drive for a motor vehicle, comprising a torque multiplying transmission mechanism having an input shaft and an output shaft and a final drive mechanism having an input pinion drivably coupled to and substantially axially parallel with the output shaft of the transmission mechanism, said final drive mechanism having output shaft means substantially perpendicular to but vertically displaced from said axis, said final drive mechanism having a ring gear coaxial with said last-mentioned output shaft means, said transmission mechanism being located on one side of said output shaft means, said pinion being located on the opposite side of said output shaft means, said transmission output shaft extending across said ring gear from one side to the other thereof, partitioning means extending across and sealed with respect to said transmission output shaft at a position between said transmission mechanism and said pinion and providing fluid-tight segregation between said transmission mechanism and the final drive mechanism, said partitioning means lying at least partly within the axially extended periphery of the ring gear.

2. In a combined sprung transmission and final drive assembly for a motor vehicle, including a torque converting transmission mechanism and a final drive mechanism, casing portions providing separate enclosures for each of said mechanisms, means for rigidly detachably securing said casing portions together, a shaft extending from one of said casing portions into the other for transmitting a drive from one to the other of said mechanisms, wall means isolating said two mechanisms from one another and through which said shaft extends, and two lubricant retaining means axially spaced along and coacting with said shaft and with said wall means, the space between said lubricant retaining means being isolated from the spaces within both of said casings and provided with an open drain through which lubricant may escape by gravity, and whereby lubricant, and pressure, are prevented from building up between said two lubricant retaining means, and are also prevented from being forced past both such retaining means.

3. In a combined sprung transmission and final drive assembly for a motor vehicle, including a torque converting transmission having an input shaft and an output shaft mechanism and a final drive mechanism having an input pinion drivably coupled to the output shaft of the transmission mechanism, casing portions providing separate enclosures for each of said mechanisms, said final drive having a ring gear meshing with said pinion and said transmission output shaft extending from one of said casing portions into the other and extending across the face of said ring gear and carrying said pinion fast thereupon for transmitting a drive from one to the other of said mechanisms, wall means isolating said two mechanisms from one another and through which said shaft extends, said wall means including a fluid-tight partitioning portion lying at least partly within the axially extended periphery of the ring gear, and two lubricant retaining means axially spaced along said shaft and also lying at least partly within the axially extended periphery of the ring gear and sealing the shaft and wall means with respect to said two enclosures of said casing portions at two positions spaced longitudinally along said transmission output shaft between the transmission mechanism and the pinion, said lubricant retaining means being isolated from the spaces within both of said casings and provided with an open drain through which lubricant may escape by gravity, and whereby lubricant, and pressure, are prevented from building up between said two lubricant retaining means, and are also prevented from being forced past both such retaining means.

4. An assembly as defined in claim 3 including an indented side wall forming a part of said casing portions and of said partitioning portions, said indented side wall being open to the exterior of both of said enclosures and having a venting drain opening located below and communicating with the space between said lubricant retaining means.

References Cited in the file of this patent

UNITED STATES PATENTS

| | | |
|---|---|---|
| 1,983,392 | Nilsson | Dec. 4, 1934 |
| 2,000,605 | Moorehouse | May 7, 1935 |
| 2,192,325 | Nelson | May 5, 1940 |
| 2,240,317 | Swenson | Apr. 29, 1941 |
| 2,241,606 | Kysor | May 13, 1941 |
| 2,691,902 | Lyons | Oct. 19, 1954 |

UNITED STATES PATENT OFFICE

CERTIFICATE OF CORRECTION

Patent No. 2,923,173            February 2, 1960

Roscoe C. Hoffman

It is hereby certified that error appears in the printed specification of the above numbered patent requiring correction and that the said Letters Patent should read as corrected below.

Column 1, line 31, for "of transmission" read -- of the transmission --; column 2, line 2, for "posses" read -- possess --; column 6, line 66, strike out "mechanism", first occurrence, and insert the same after "transmission" in line 65, same column; column 7, line 11, after "pinion," insert -- the space between --; column 8, line 14, list of references cited, for "May 5, 1940" read -- Mar. 5, 1940 --.

Signed and sealed this 9th day of August 1960.

(SEAL)
Attest:

KARL H. AXLINE
Attesting Officer

ROBERT C. WATSON
Commissioner of Patents